Figure 1:
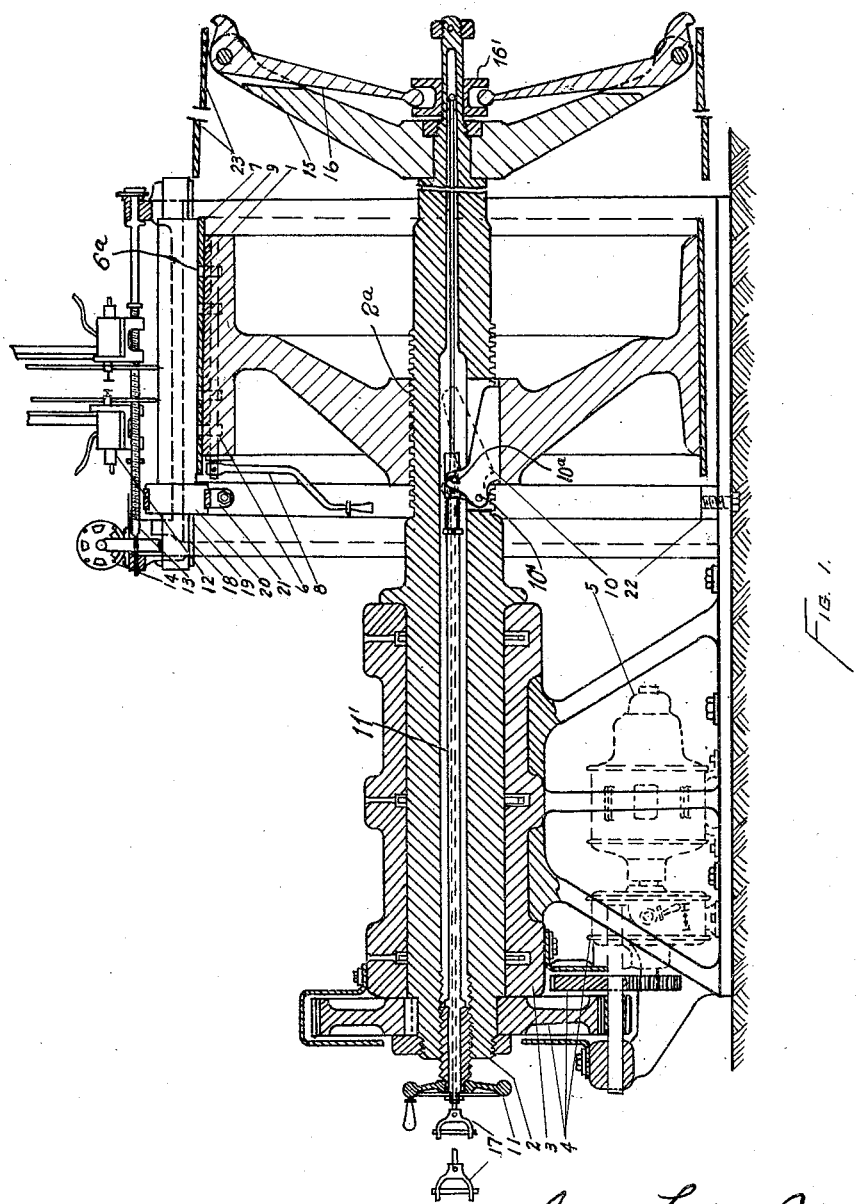

July 12, 1932.  J. L. ADAMS, JR  1,866,610

MACHINE FOR FABRICATING TUBULAR METAL STRUCTURES

Filed Jan. 3, 1928   2 Sheets-Sheet 1

James Lucian Adams Jr.
INVENTOR.

July 12, 1932.  J. L. ADAMS, JR  1,866,610
MACHINE FOR FABRICATING TUBULAR METAL STRUCTURES
Filed Jan. 3, 1928    2 Sheets-Sheet 2
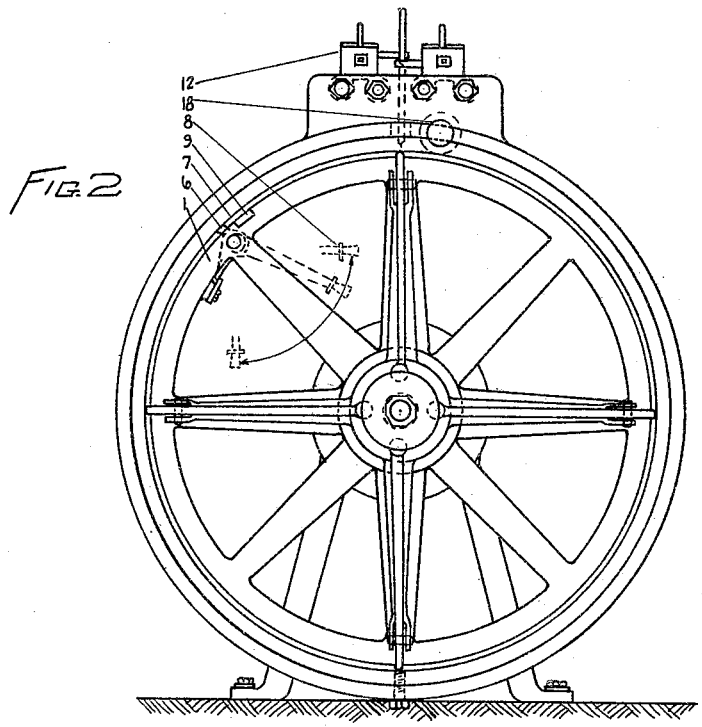
Fig. 2
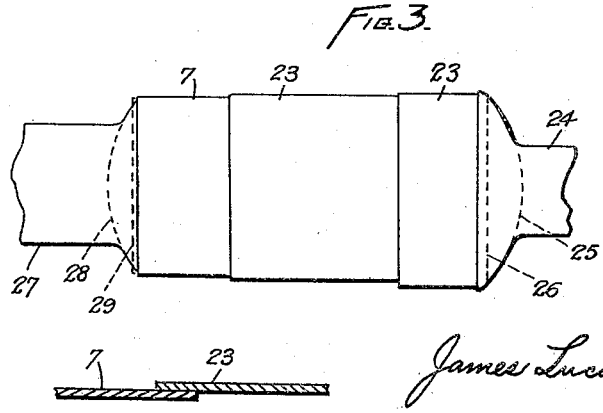
Fig. 3
Fig. 4
James Lucian Adams Jr.
INVENTOR.

Patented July 12, 1932

1,866,610

UNITED STATES PATENT OFFICE

JAMES LUCIAN ADAMS, JR., OF EAST CHICAGO, INDIANA, ASSIGNOR OF NINE-TENTHS TO GRAVER CORPORATION, OF EAST CHICAGO, INDIANA, A CORPORATION OF ILLINOIS

MACHINE FOR FABRICATING TUBULAR METAL STRUCTURES

Application filed January 3, 1928. Serial No. 244,336.

One of the objects of my invention is to provide means whereby the manufacture or fabrication of certain tubular type metal structures can be greatly accelerated, and carried out at a lower cost than has been customary heretofore, with the usual methods of construction.

With this object in view, I have provided means for expeditiously and cheaply assembling a hollow metal structure, of almost any desired total length, from ring sections, which are in turn formed up rapidly from raw plate stock of such dimensions as will give lowest material cost.

To this end, I have devised certain novel apparatus to facilitate the work of fabrication, which apparatus will be now illustrated and described in detail.

Referring to the drawings, Fig. 1 is a vertical axial cross section of a complete machine, showing the general assembly of my invention, indicating one preferred construction, and the general relation of nearly all the parts.

Fig. 2 is an end elevation, showing the method of winding on the plate to form a tube, which is to be eventually joined together along the seam.

Fig. 3 shows one form of typical fabricated product, in which the tacking together of the successive ring sections, and the end heads, or inserts, if any, is assumed to have been done by spot arc or resistance welding, or oxy-acetylene welding, or other equivalent means, preparatory to the final subsequent sealing closure of all seams. This process of tacking together the complete structure will give a low cost of assembly, but at the same time a final product which will in general be materially less accurate in alignment and dimensions, than where some form of interlock is utilized.

Fig. 4 shows an enlarged detail cross section of one of the joints between two successive ring-sections of Fig. 3.

Developments incorporating some form of mechanical interlock at the joint will be evident to anyone skilled in the art, and will in general result in materially improved accuracy and speed of production, but are not shown on the drawings, because foreign to the subject of the immediate application.

Referring now specifically to Fig. 1, there is a wheel or a spider 1 which has a slightly coned outer cylindrical rim, preferably turned true to the diameters and taper required to give successive plate-rings which will just telescope into one another a sufficient amount to give the requisite joint lap required for the circular seams, when the rings are pressed home into one another by any suitable pressure producing means, as later shown.

Such tapered rim surface at the same time provides the means for ready stripping of the formed ring from the wheel or spider rim, without the necessity of collapsing the rim in diameter in order to permit this. Supporting the spider 1 is a heavy threaded shaft 2, the shaft having an intermediate threaded portion 2a cooperating with the correspondingly threaded interior bore of the spider. This shaft is in turn mounted in the long outboard bearing 3, in such manner that it can be driven at one or more low speeds in either required direction, thru the reduction gear train 4, in turn driven by the motor, or other suitable driving means 5.

Carried by the spider 1 is one or a plurality of dog-grips 6, having pin projections 6a which can be made to engage with corresponding holes, previously punched, in the plate 7 being formed-up, by proper functioning of the operating lever 8. If desired, there may be provided a heavy copper or other suitable bar 9, located so as to be of service during the seam welding process, when such happens to be done by the arc method.

For securing the spider to the shaft for rotation therewith, there may be provided a key clutch, or equivalent device, preferably comprising a dog 10, having a pivotal mounting 10' about which the dog may be swung into operative full line position, or inoperative dotted-line position of Figure 2. This dog is operated through the medium of a control wheel 11 operatively connected to the dog by the hollow rod 11'. The rod 11' actuates the dog 10 by means of a pin connection 10a. By means of this construction, it is possible to key the spider to the shaft so as to secure simultaneous rotation between these members, or to release the spider from the shaft so as to permit independent rotation between the two.

Item 12 is one or a plurality of arc-welders, or other suitable means for making a substantial closure of the longitudinal seam between the two ends of the plate-ring 7, and as shown, is operated thru the screw or screws and attendant reduction gearing 13, by the small driving motor 14; subject to many evident changes, however, if so desired, without material alteration of the intent and purpose of this specification.

Mounted freely on shaft 2 is an outboard spider 15 carrying lever-arms 16, which are all operated together by a yoke 16', connected thru the hollow center of the control means 11 and 11', to the control handle 17, or equivalent device, by which the outer tips of levers 16 can be made to engage with the circular edge of a previously formed plate-ring 23, or more or less similar part, whenever required, as will be explained fully later on.

A long, heavy roll 18 is mounted in bearings 19 so as to be suitably supported above the wheel 1, and preferably provided with a heavy band-brake 20, whose rotational friction can be varied as required by the adjusting means 21, or other substantially identical means.

A longitudinal stop 22 is provided by means of which the formed-up plate-ring 7 and its then associated parts, if any, can be released and stripped from the conical cylindrical surface of spider 1, when required.

For purposes of illustration there is indicated in the drawings previously formed plate-ring, approximately identical with the plate-ring 7, and into which the latter is to be pressed to a distance suitable for the lap-joint type of construction, while at the same time the new ring 7 is held firmly in an axial position.

In Figure 3 of the drawings there is illustrated in side elevation one form of article produced in accordance with the present invention. In this figure the plate rings 23 indicate those first formed while the plate ring 7 is the one last formed. The reference characters 24, 25 and 26 represent parts which may be incorporated, for example, in one end of a completed article, while the references characters 27, 28 and 29 represent parts which may be incorporated in the opposite end. The particular shape and configuration of such parts, however, is not a limiting factor in the present invention, the invention being more particularly concerned with the forming and fabricating of the sections.

Having now indicated the object of my invention, and shown on the drawings a complete machine capable of accomplishing the desired result, I will proceed to described its general mode of operation, starting from the raw plates on a pile situated conveniently to one side of the machine, at the proper height for ready feeding. These plates will preferably, however, have already been trimmed to proper length and squared off at both ends, at one and the same operation, and while clamped down continuously thruout their length, by two co-acting pairs of shears, the forward one of which will also preferably punch a plurality of holes close to the end and about evenly spaced, for direct engagement with the dog-grip 6, and at the same time so trim the plate end as to provide for a butt joint close to the plate edges, and a lap joint thruout the remainder of the total seam length, such as will completely cover up all the holes made for the dog-grip 6.

Note, however, that such two co-acting pairs of shears, or their equivalent, constitute simply a necessary complement to the present invention, and not a constituent element of the same, and are mentioned merely to round out the explanatory text covering the general process of fabrication involved. The main fabrication process is initiated by throwing on the motor 5, which functions thru gearing 4 to rotate the shaft 2 and bring the spider 1 to its proper axial position along the threaded section of such shaft. At this time the motor is slowed down sufficiently to permit the key-clutch 10 to be engaged via the control 11, after which the spider 1 is rotated just sufficiently to bring the dog-grips 6 into proper position for the entry of a new plate 7, which latter is now drawn over from the pile and so placed that it can be engaged with the grips 6, by means of the control 8. The motor 5 is now again started up in same direction as before, after setting the reduction gear train at its "L," or lowest speed position, and brake 21 having been drawn up once for all to its proper tension, the plate 7 is dragged around the rim of the spider 1, and under the tension roll 18, until its ends meet or lap, according to the type of joint under consideration. If necessary, a metallic wedge is now driven in under the rear side of roll 18, to hold the final end of plate down in close contact with the forward edge, altho this may not be found to be essential, after which the welders 12 are started up and carried along their respective portions of the seam, by means of the screw and reduction gear 13 and the motor 14. On completion of this weld, a previously formed ring-section 23, if any, together with its already associated parts, if any, is moved over axially until its trailing circular edge is in close proximity to, or just slightly overlapping, the forward edge of the plate ring 7, after which control 17, which controls the lever-arms 16 at the right, is thrown in, causing the latter to engage at their outer ends with the edge of the ring 23, following which the key-clutch 10 is disengaged from the shaft 2, by proper functioning of the control 11. The motor is then again started up in same direction as before, this time driving the spider 1, and along with it the now formed-up tube 7, axially along the shaft 2 toward the right, so as to press such tube 7 solidly home into the trailing edge of section 23, which is held from movement in the manner described.

When such pressing operation is completed, according to the judgment of the operator, and while all the parts concerned are held up rigidly in place, sections 7 and 23 are tack-welded or otherwise conveniently attached temporarily to one another, by means constituting no essential part of this immediate application, after which the lever-arms 16 are released from contact with the ring 23, by throwing the control 17 to the left, the grips 6 withdrawn radially, by means of the control handle or lever 8, the gear-reduction 4 is preferably set at its "H", or higher speed point, and the motor 5 started up in its reverse direction, so as to now move the wheel 1, together with its still firmly attached plate-ring 7, clear over to the left along the shaft axis, until the edge of such ring strikes the limit stop 22, and retards its further progress, while the wheel 1 goes on some inches further, or until said section 7 has been sufficiently freed from the conical surface of same, to permit the latter's ready removal to the right, by any suitable means, but all foreign to this application.

On now bringing the driving motor to rest, which can readily be done by an automatic stop if desired, altho this also is entirely foreign to this application, we complete the cycle of operations covered by this general fabrication process, and leave the machine ready for its repetition.

By making use of a specially shaped pressing ring, the rotation of shaft 2, inside of the wheel 1, can be made use of to assist in pressing home tank-heads or other insert parts, after the associated rings 7, 23, etc. have been removed to the right of the machine, and against some suitable stop, all again foreign to the present application.

If the entire structure is to be made liquid or gas tight, it is now moved over to the appropriate station for the purpose, and welded, brazed, galvanized, leadized, or otherwise processed for this purpose, as a subsequent step, supplementary to those immediately covered by this application.

As shown, this structure is better adapted for welding, than for brazing or galvanizing or other hot-dip processing, for the projection of the circular joints is almost too meager for such latter purposes, giving very poor entry into the molten metal pots.

While I have herein illustrated and described certain preferred features of the present invention, it will be understood that the invention is not limited in its utility to the production of articles of any particular contour; and that it may be embodied in other forms of apparatus without departing from either the spirit of the invention or the scope of my broader claims.

What I claim to be new, and desire to protect by Letters Patent is:

1. In a fabricating machine, shaping means adapted to produce a conical shape having a greater diameter at one end than the other, retractable attaching means cooperating therewith for holding the material to be shaped adjacent the shaping means, and other means cooperating with the shaping means for securing the adjacent end portions of a formed plate.

2. In a machine for fabricating tubular metal structures, a rotatable element having portions of different diameter, gripping means cooperating therewith for securing a plate to said element while the latter is rotated to bring the end portions of the plate into adjacent relationship, and means for engaging a previously shaped plate supported in position for assembly therewith.

3. In a machine for fabricating tubular metal structures, a rotatable element having portions of different diameter, gripping means cooperating therewith for securing a plate to said element to bring the end portions thereof into adjacent relationship as the element is rotated, and means for engaging a previously shaped plate supported in position for assembly therewith, with the respective shaped plates in substantially axial alignment.

4. In a machine for fabricating tubular metal structures, a shaft journaled in bearings for rotary movement, a shaping element, having portions of different diameters, on said shaft, means for rotating said element with said shaft, plate holding means cooperating with said element, and means for moving said element axially with said shaft in either direction at will.

5. In a metal fabricating machine, a conical shaping spider, gripping means carried thereby, means for rotating said spider, or moving same axially in either direction at will, and holding means for engaging a previously formed shape axially aligned with said spider.

6. In a metal fabricating machine, a shaft having a threaded portion, a conical shaping element carried by said threaded portion, means for rotating said shaft, means for securing said element to said shaft or releasing the same therefrom for either rotating said element or producing axial movement thereof, and gripping means cooperating with said element.

7. In a metal fabricating machine, a shaft having a threaded portion, a conical shaping element carried by said threaded portion, means for rotating said shaft, means for securing said element to said shaft or releasing the same therefrom for either rotating said element or producing axial movement thereof, gripping means cooperating with said element, and retaining means axially displaced relative to said element.

8. In a metal fabricating machine, a shaft having a threaded portion, a conical shaping element carried by said threaded portion, means for rotating said shaft, means for securing said element to said shaft or releasing the same therefrom for either rotating said element or producing axial movement thereof, gripping means cooperating with said element, and collapsible retaining means axially displaced relative to said element.

In witness whereof, I hereunto subscribe my name.

JAMES LUCIAN ADAMS, Jr.